May 18, 1926.
K. K. ROBY
1,585,629
MOTOR CONTROL
Filed Jan. 24, 1925
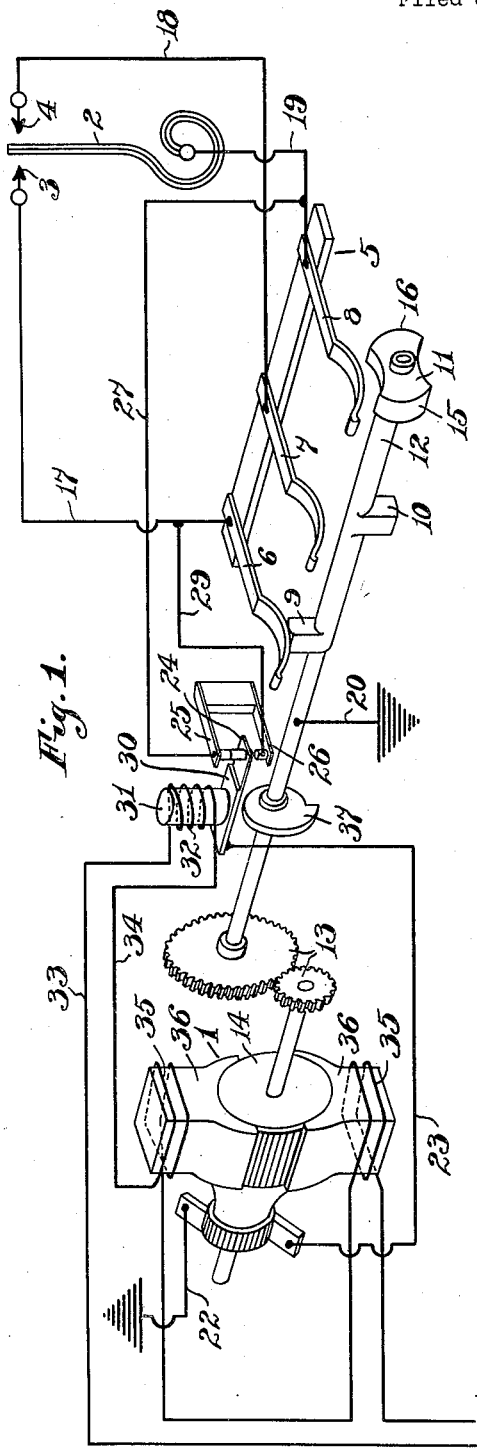
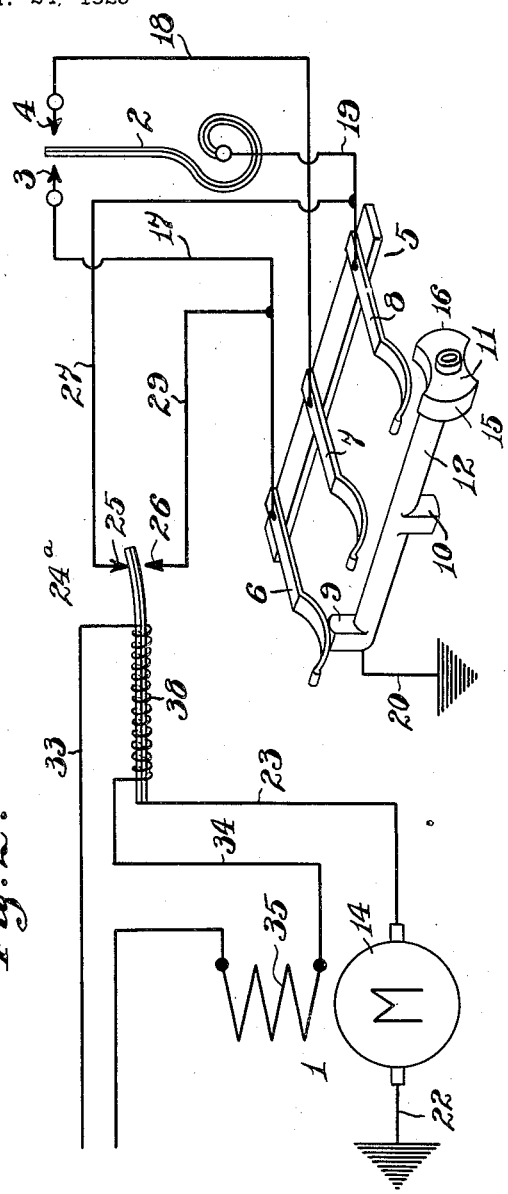
INVENTOR.
Kenneth K. Roby,
BY
Hood + Hahn
ATTORNEYS Patented May 18, 1926.

1,585,629

UNITED STATES PATENT OFFICE.

KENNETH K. ROBY, OF WABASH, INDIANA, ASSIGNOR TO THE HONEYWELL HEATING SPECIALTIES COMPANY, OF WABASH, INDIANA, OF WABASH, INDIANA, A CORPORATION OF INDIANA.

MOTOR CONTROL.

Application filed January 24, 1925. Serial No. 4,398.

My invention relates to improvements in controlling means for electric motors and particularly to that class of controlling means thermostatically operated which, under predetermined conditions will cause the motor to operate for a predetermined period and which, under other predetermined conditions, will cause the motor to operate for another predetermined period to set the apparatus controlled thereby to off position.

One of the objects of my invention is to provide means for automatically conditioning the circuit of the motor so that in event of failure of current or failure of voltage in the line the controlling apparatus will be so conditioned that upon restoration of line voltage or line current the motor will be caused to operate to restore the apparatus controlled thereby to off position in event such apparatus is not, when the line voltage fails, in such position.

My invention is particularly designed for controlling an electric motor adapted to operate the control mechanism of oil burners for boilers or furnaces or the like, the off position in such instance being the starting position for the burner.

For the purpose of disclosing my invention I have illustrated certain embodiments thereof in the accompanying drawings in which, Fig. 1 is a diagrammatic view of a motor and controlling mechanism therefor, and Fig. 2 is a diagrammatic view of a modification thereof.

In the embodiment illustrated the motor 1 of the repulsion type and having the short circuit between the brushes opened and closed for starting and stopping the same may be adapted for operating the control mechanisms of oil burners for boilers, furnaces and the like and is controlled by a thermostatic switch comprising thermostatic strip 2 preferably of bimetallic construction and comprising the movable contact member of the thermostatic switch. This movable contact member is adapted to make contact respectively with the stationary contacts 3 and 4. In addition to the thermostatic switch I provide in the motor circuit, a second switch 5 having a plurality of stationary contact fingers 6, 7 and 8 which are adapted to make contact respectively with the movable contact fingers 9, 10 and 11. These fingers take the form of cam members mounted on a shaft 12 driven by a suitable gear connection 13 from the armature 14 of the motor 1. The contact finger 11 takes the form of a double cam member having the two cam surfaces 15 and 16. The contact finger 6 is connected by the conductor 17 with the stationary contact 3 of the thermostatic switch and the contact finger 7 is connected by conductor 18 with the stationary contact 4 of the thermostatic switch, while the movable contact finger 2 of this thermostatic switch is connected by conductor 19 with contact finger 8. The movable fingers 9, 10 and 11 are connected by conductor 20 with the ground and one brush of the motor is connected by conductor 22 to ground. The opposite brush is connected by conductor 23 with a relay contact 24 adapted to make contact with either of the contact fingers 25 or 26, the finger 25 being connected by conductor 27 with contact finger 8 and the finger 26 being connected by conductor 29 with the contact finger 6. This relay contact 24 is provided with an armature 30 of a relay magnet 31, the coil 32 of which is connected in series by conductors 33 and 34 with the field coils 35 of the field magnet 36 of the motor, which coils are in turn connected to a suitable alternating current supply. Electro-magnet 31, when energized, is of sufficient strength to maintain its armature 30 in an attracted or raised position although it is not of sufficient strength to raise the armature in event the armature is in its lowered position, and for raising the armature under certain predetermined conditions a cam 37 is mounted on shaft 12 which, when the shaft is rotated to a predetermined position, will engage the armature 30 and raise the same until it comes within the magnetic influence of the electro-magnet 31.

In the normal operation of the apparatus the armature 30 is attracted by the electromagnet 31 and the mechanism controlled by the motor 1 is in the "off" position when the finger 10 is in engagement with the contact finger 7. With the parts in this position and the thermostatic member in its intermediate position, the apparatus will be quiescent. In event the thermostatic member is affected by the temperature to cause the member 2 to engage contact 4 circuit will be closed from one brush of the rotor 14 by the conductor 23 through the relay contacts 24 and 25, conductors 27 and 19, through the thermostatic switch by contact members 2 and 4, thence by conductor 18 to contact finger 7 and as the contact finger is in engagement with contact finger 10 by the way of contact finger 10, shaft 12 and conductor 20 to ground. Due to the fact that the opposite brush of the rotor is connected by conductor 22 to ground the short circuit between the brushes will be closed and the motor will start operating the apparatus controlled thereby and at the same time rotating the shaft 12 moving contact 10 out of engagement with contact finger 7, but at the same time causing cam surface 16 to engage contact finger 8. This engagement takes place a little before contact finger 10 moves out of engagement with contact finger 7 so that the rotor circuit will be uninterrupted due to the fact that a new circuit will be established from conductor 27 by the way of contact finger 8, cam member 11, shaft 12 and conductor 20 to ground. This causes the motor to continue to operate for a predetermined period of time and at the same time current is carried by the thermostatic contact member 2 for a very short period. The motor continues to operate until the cam surface 16 moves out of engagement with the finger 8 thereby opening the rotor circuit. As the cam surface 16 moves out of engagement with the finger 8 the contact 9 moves into engagement with the finger 6. However, as the motor circuit has been opened the parts will come to rest with the apparatus controlled by the motor in its "on" position, the parts of the controller being ready to cause the motor to move the apparatus controlled thereby to its off position when the thermostatic member 2 is affected by the temperature to cause it to move into engagement with contact 3. Under these circumstances circuit will be closed from one brush of the rotor of the motor by conductor 23 through relay contacts 24 and 25, conductors 27 and 19, by thermostatic switch member 2 and contact 3 to conductor 17 and thence by contact fingers 6 and 9 to cam shaft 12 and thence by conductor 20 to ground. The motor is thus started and moves the apparatus controlled thereby toward off position, at the same time rotating cam shaft 12. As contact 9 moves out of engagement with finger 6 cam surface 15 moves into engagement with contact 8 thereby preventing interruption of the motor circuit by establishing a circuit from conductor 27 to contact finger 8, cam surface 15 and cam shaft 12 instead of through the thermostatically controlled switch and fingers 6 and 9. The motor continues to operate until cam surface 15 has moved out of engagement with contact finger 8 and the parts are brought to rest with the apparatus controlled by the motor in its off position. At the same time finger 10 is moved into engagement with contact finger 7 so that the motor circuit will be re-established upon contact of the thermostatic member 2 with contact 4. This is the normal operation of the apparatus.

In certain type of apparatus to be controlled it is desirable, in event the apparatus is in the on position and line current fails and is then restored, to move the apparatus to off position and at the same time restore the motor control parts to normal operating conditions. Due to the fact that the electro-magnet 31 of the relay switch is in series with the field windings of the motor, in event of failure of the line current the electro-magnet will be de-energized permitting its armature 30 to drop and closing circuit between the contact 24 and the contact 26. This will establish the short circuit of the rotor from one brush of the rotor by conductor 23, contacts 24 and 26, conductor 29, contact fingers 6 and 9 to cam shaft 12 and thence by wire 20 to ground. Immediately upon resumption of line current or line voltage, the motor will start and continue to operate as heretofore described, until the contact finger 10 is in engagement with the contact finger 7 and the apparatus controlled by the motor in its off position. At the same time the cam 37 will raise the armature 30 until contacts 24 and 25 engage and as the electro-magnet 31 is energized the armature will be retained in this position irrespective of the movement of the cam shaft 12.

In the arrangement illustrated in Fig. 2 the circuit connections and parts are the same as those illustrated in Fig. 1 with the exception of the relay. In the arrangement in Fig. 2 the relay switch 24ª comprises a thermostatically affected member preferably of bimetallic construction, which member is surrounded by a resistance coil 38 connected in series with the field windings 35 of the motor. By this arrangement as long as current is passing through the field windings and therefore through the resistance coil 38 the contact member 24ª is in engagement or is in contact with the contact 25. In event of a failure of line current or voltage, the resistance coil 38 cools, thereby causing the contact member 24ª to move into engagement with contact 26 and upon re-establishment of the line circuit or voltage, the parts will operate as described with respect to Fig. 1. As the contact surface 15 moves into engagement with the contact finger 8 almost immediately upon the starting of the motor the short circuit for the rotor brushes through the contact finger 8 and cam surface 15 will be re-established before the heat of the resistance coil 38 has affected the thermostatic member 24ª sufficiently to cause it to move out of engagement with contact 26. However, the continued heating of the thermostatic contact member 24ª will cause it to eventually move into engagement with contact 25. By this time, however, the apparatus controlled by the motor will have been moved to its off position so that the normal circuit conditions will be restored.

I claim as my invention:

1. The combination with an electric motor, of a thermostatic switch having two circuit closing positions, a plurality of switches having contacts movable in synchronism with the motor, one of said switches when in a predetermined position being adapted to establish the motor circuit for one circuit closing position of the thermostatic switch and the other being adapted when in a predetermined position to establish the motor circuit for the other circuit closing position of the thermostatic switch, and a relay operated by low voltage conditions in the motor circuit for establishing a motor circuit to one of said movable contact switches independently of the thermostatic switch.

2. The combination with an electric motor, of a thermostatic switch having two circuit closing positions, a movable member of said switch constituting a circuit-carrying contact, a plurality of switches having movable contacts movable in synchronism with the motor, one of said switches in a predetermined position being adapted to establish the motor circuit for one circuit closing position of the thermostatic switch, another of said switches being adapted in a predetermined position to establish the motor circuit for the other circuit closing position of the thermostatic switch, a third of said switches being adapted, in predetermined positions, to short circuit the circuit-carrying member of the thermostatic switch, and a relay normally maintaining the circuit to said circuit-carrying member and said third movable switch and operated by low voltage conditions of the motor to open said circuit and establish circuit connection to said first mentioned movable switch.

3. The combination with an electric motor, of a thermostatic switch having two circuit closing positions, of a plurality of movable contact switches the movable contacts thereof being movable in synchronism with the motor, one of said switches being adapted in a predetermined position to establish motor circuit for one of the circuit closing positions of the thermostatic switch and another of said switches in a predetermined position being adapted to establish motor circuit for the other circuit closing position of the thermostatic switch and the third movable contact switch being adapted in predetermined positions to establish a motor circuit short circuiting the thermostatic switch, and a relay normally maintaining closed circuit conditions to said thermostatic switch and said short circuiting switch and on low voltage conditions adapted to open said circuit and establish a motor circuit to the first movable switch independent of the thermostatic switch.

4. The combination with an electric motor, of a thermostatic switch having two circuit closing positions, of a switch having a movable contact which when in a predetermined position co-operates with one of said circuit closing positions of the thermostatic switch to establish motor circuit, a second switch having movable contact which when in a predetermined position co-operates with the other of said circuit closing positions of the thermostatic switch for establishing the motor circuit and a third switch having a movable contact which in predetermined positions is adapted to establish a motor circuit short circuiting said thermostatic switch, and a relay normally maintaining circuit connections to said thermostatic switch and said short circuiting switch and adapted on low voltage conditions to establish a motor circuit short circuiting said thermostatic switch.

5. The combination with an electric motor, of a thermostatic switch having a movable and two stationary contacts, of a controller having three stationary contacts and three movable contacts operated by said motor adapted to engage their respective stationary contacts at different periods and connected with one terminal of the motor, one of said stationary controller contacts being connected with one of the stationary thermostatic switch contacts, a second stationary controller contact being connected with the other stationary thermostatic switch contact and the third stationary controller contac being connected with the movable thermostatic switch contact, and a low voltage switch having a movable and two stationary contacts, the movable contact being connected to the opposite terminal of the motor and one of the stationary contacts being connected to the third controller stationary contact while the other stationary underload switch contact is connected with the first stationary controller contact.

In witness whereof, I KENNETH K. ROBY have hereunto set my hand at Wabash, Indiana, this 15 day of January, A. D. one thousand nine and twenty five.

KENNETH K. ROBY.